(12) United States Patent
Kataoka

(10) Patent No.: US 11,215,324 B2
(45) Date of Patent: Jan. 4, 2022

(54) HIGH PRESSURE CONTAINER UNIT

(71) Applicant: TOYOTA JIDOSHA KABUSHIKI KAISHA, Aichi-ken (JP)

(72) Inventor: Chiaki Kataoka, Nagakute (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 230 days.

(21) Appl. No.: 16/690,130

(22) Filed: Nov. 21, 2019

(65) Prior Publication Data

US 2020/0191335 A1 Jun. 18, 2020

(30) Foreign Application Priority Data

Dec. 17, 2018 (JP) ............................ JP2018-235172

(51) Int. Cl.
*F17C 13/12* (2006.01)
*B60K 15/035* (2006.01)
(Continued)

(52) U.S. Cl.
CPC ........ *F17C 13/12* (2013.01); *B60K 15/03519* (2013.01); *F17C 13/06* (2013.01);
(Continued)

(58) Field of Classification Search
CPC .. F17C 13/12; F17C 13/06; F17C 2205/0176; F17C 2270/0178; F17C 2205/0317; F17C 2205/0332; F17C 2205/0382; F17C 2221/012; F17C 2223/0123; F17C 2223/036; F17C 2227/0114; F17C 2250/0439; F17C 2250/0636; F17C 2260/042; F17C 2270/0168; F17C 2205/0146; F17C 2201/035; F17C 2205/0111; F17C 12/123; F17C 1/00; B60K 15/03519; B60K 2015/03026; B60K 2015/03421; Y02E 60/32
(Continued)

(56) References Cited

U.S. PATENT DOCUMENTS 1,151,764 A * 8/1915 Dodson ............... F16K 17/1613
220/89.3
3,139,103 A * 6/1964 Bottum ................... F16J 15/06
137/72
(Continued)

FOREIGN PATENT DOCUMENTS

CN 204801777 U 11/2015
CN 106593909 A 4/2017
(Continued)

*Primary Examiner* — Timothy L Maust
*Assistant Examiner* — James R Hakomaki
(74) *Attorney, Agent, or Firm* — Hauptman Ham, LLP

(57) ABSTRACT

A high pressure container unit includes a container body configured to store high pressure gas, a case storing the container body inside the case, a pipe connected with the container body and extending to an outside of the case, a closing member that is configured to close the pipe and allow the high pressure gas stored in the container body to be discharged from the pipe when a given condition is satisfied, and a ventilation mechanism that discharges air inside the case to the outside of the case with use of pressure of the discharged high pressure gas when the given condition is satisfied.

16 Claims, 7 Drawing Sheets

(51) Int. Cl.
  *F17C 13/06* (2006.01)
  *B60K 15/03* (2006.01)

(52) U.S. Cl.
  CPC .............. *B60K 2015/03026* (2013.01); *B60K 2015/03421* (2013.01); *F17C 2205/0176* (2013.01); *F17C 2270/0178* (2013.01)

(58) Field of Classification Search
  USPC ......................................................... 137/72
  See application file for complete search history.

(56) References Cited

U.S. PATENT DOCUMENTS

| | | | | |
|---|---|---|---|---|
| 4,273,251 A | * | 6/1981 | McMahon | ............ F16K 17/403 |
| | | | | 137/72 |
| 4,522,159 A | | 6/1985 | Engel et al. | |
| 5,240,024 A | * | 8/1993 | Moore | .................... F17C 13/04 |
| | | | | 137/38 |
| 5,954,099 A | * | 9/1999 | Princiotta | ............... B60P 3/055 |
| | | | | 141/18 |
| 6,257,360 B1 | * | 7/2001 | Wozniak | ................... F17C 1/02 |
| | | | | 180/69.5 |
| 6,564,833 B2 | * | 5/2003 | Ono | ..................... B60K 15/013 |
| | | | | 137/587 |
| 7,270,209 B2 | * | 9/2007 | Suess | ............... B60K 15/03006 |
| | | | | 180/69.5 |
| 7,337,799 B2 | * | 3/2008 | Delfino | ................. F17C 13/123 |
| | | | | 137/79 |
| 7,624,753 B2 | * | 12/2009 | Suess | ............... B60K 15/03006 |
| | | | | 137/266 |
| 7,757,727 B2 | * | 7/2010 | Handa | ..................... F17C 13/12 |
| | | | | 141/82 |
| 9,174,531 B2 | * | 11/2015 | Finck | ............... B60K 15/03006 |
| 2004/0026427 A1 | * | 2/2004 | Shigematsu | ...... B60K 15/03006 |
| | | | | 220/562 |
| 2004/0159352 A1 | * | 8/2004 | Friedlmeier | .......... F17C 13/084 |
| | | | | 137/266 |
| 2006/0057040 A1 | * | 3/2006 | Shih | ...................... C01B 3/0031 |
| | | | | 422/211 |
| 2018/0283610 A1 | * | 10/2018 | Wexler | ............. B60K 15/03006 |

FOREIGN PATENT DOCUMENTS

| | | |
|---|---|---|
| JP | 2005-337338 A | 12/2005 |
| JP | 2010-47046 A | 3/2010 |
| JP | 201070028 A | 4/2010 |

\* cited by examiner

HIGH PRESSURE CONTAINER UNIT

INCORPORATION BY REFERENCE

The disclosure of Japanese Patent Application No. 2018-235172 filed on Dec. 17, 2018 including the specification, drawings and abstract is incorporated herein by reference in its entirety.

BACKGROUND

1. Technical Field

The disclosure relates to a high pressure container unit.

2. Description of Related Art

Japanese Unexamined Patent Application Publication No. 2010-047046 (JP 2010-047046 A) discloses a structure in which a fuel tank and a battery are mounted on a lower part of a vehicle. In JP 2010-047046 A, space in which the battery is arranged and space in which the fuel tank is arranged communicate with each other through a communication flow path, and a fan is provided in the communication flow path. While fuel is being supplied, the fan is rotated in a first direction so that air is sent from a battery side to a fuel tank side. While the fuel is being consumed, the fan is rotated in the opposite direction so that air is sent from the fuel tank side to the battery side.

SUMMARY

However, in the structure described in JP 2010-047046 A, no consideration is given to a case where temperature of the lower part of the vehicle becomes high. Thus, there is room for improvement in terms of protecting a high pressure container such as a fuel tank when temperature of a lower part of a vehicle becomes high.

The disclosure provides a high pressure container unit in a structure in which a high pressure container is mounted on a lower part of a vehicle. The high pressure container unit is able to protect the high pressure container when temperature of the lower part of the vehicle becomes high.

A high pressure container unit according to a first aspect of the disclosure includes a container body, a case, a pipe, a closing member, and a ventilation mechanism. The container body is configured to store high pressure gas. The case is configured to store the container body inside the case. The pipe is connected with the container body and extends to an outside of the case. The closing member is configured to close the pipe and allow the high pressure gas stored in the container body to be discharged from the pipe when a given condition is satisfied. The ventilation mechanism discharges air inside the case to the outside of the case with use of pressure of the discharged high pressure gas when the given condition is satisfied.

In accordance with the high pressure container unit according to the first aspect, the container body that stores the high pressure gas is stored inside the case. Because the container body is provided inside the case as described above, it is possible to protect the container body.

Also, the pipe connected with the container body extends to the outside of the case and is usually closed by the closing member. Also, when the given condition is satisfied in which, for example, temperature of the lower part of the vehicle becomes high, the closing member allows the high pressure gas stored in the container body to be discharged from the pipe to the outside of the case.

Further, the high pressure container unit according to the first aspect is provided with the ventilation mechanism that allows air inside the case to be discharged to the outside of the case. Also, the ventilation mechanism is configured to discharge air inside the case to the outside of the case when the given condition is satisfied in which, for example, temperature of the lower part of the vehicle becomes high. Thus, it is possible to restrain temperature of the inside of the case from becoming high until the high pressure gas stored in the container body is discharged.

In the high pressure container unit according to the first aspect of the disclosure, the pipe may include a common flow path and an exhaust gas flow path. The common flow path is communicated with internal space of the container body, and the exhaust gas flow path is branched from the common flow path and extends to the outside of the case. The closing member may be configured to close the exhaust gas flow path. The closing member may be configured to allow the high pressure gas stored in the container body to be discharged from the exhaust gas flow path when the given condition is satisfied.

With the foregoing configuration, the pipe further includes the common flow path and the exhaust gas flow path. Further, the exhaust gas flow path is branched from the common flow path, extends to the outside of the case, and is usually closed by the closing member. When the given condition is satisfied in which, for example, temperature of the lower part of the vehicle becomes high, the closing member allows the high pressure gas stored in the container body to be discharged from the exhaust gas flow path. Thus, it is possible to discharge the high pressure gas to the outside of the case from the exhaust gas flow path.

In the foregoing aspect, a communication flow path may be further provided. The communication flow path allows internal space of the case and external space of the case to communicate with each other. The ventilation mechanism may discharge the air inside the case to the outside of the case from the communication flow path when the given condition is satisfied.

In the foregoing aspect, the communication flow path may be connected with the exhaust gas flow path. The ventilation mechanism may include a throttle portion that is formed near a connecting portion between the exhaust gas flow path and the communication flow path. The throttle portion is made as a part of the exhaust gas flow path is narrowed down. The ventilation mechanism may suck the air inside the case from the communication flow path and discharge the air to the outside of the case due to a Venturi effect when the given condition is satisfied.

With the above configuration, since air inside the case is discharged due to a Venturi effect, it is possible to ventilate the inside of the case with a simple structure in which only the throttle portion is provided in the communication flow path.

In the foregoing aspect, the ventilation mechanism may include a first impeller provided in the exhaust gas flow path, a second impeller provided in the communication flow path, and a shaft that connects the first impeller and the second impeller with each other. The second impeller may be rotated as the first impeller is rotated.

With the foregoing configuration, the exhaust gas flow path and the communication flow path may be formed as different flow paths. It is possible to discharge air inside the case more efficiently compared to a configuration in which the communication flow path is connected with the exhaust gas flow path so that high pressure gas and air are discharged together.

In the foregoing configuration, the exhaust gas flow path may include a lateral flow path extending in a vehicle front-rear direction, and a vertical flow path connected with the lateral flow path and extending in a vehicle upper-lower direction. The closing member may be screwed into a connecting portion between the lateral flow path and the vertical flow path. The closing member may be configured to allow the lateral flow path and the vertical flow path to communicate with each other when the given condition is satisfied.

With the foregoing configuration, the exhaust gas flow path further includes the lateral flow path and the vertical flow path. Further, the vertical flow path is connected with the lateral flow path, and the closing member is screwed into the connecting portion between the vertical flow path and the lateral flow path. When the given condition is satisfied in which, for example, temperature of the lower part of the vehicle becomes high, the closing member allows the lateral flow path and the vertical flow path to be communicated with each other so that the high pressure gas is discharged to the outside of the case from the exhaust gas flow path.

In the foregoing aspect, the exhaust gas flow path may include a lateral flow path extending to a first side of the vehicle front-rear direction, and a folded flow path that is folded from the lateral flow path to a second side in the vehicle front-rear direction and is open to the outside of the case. The closing member may be screwed to a connecting portion between the lateral flow path and the folded flow path. The closing member may be configured to allow the lateral flow path and the folded flow path to communicate with each other when the given condition is satisfied.

With the foregoing configuration, the exhaust gas flow path further includes the lateral flow path and the folded flow path. Further, the folded flow path is connected with the lateral flow path, and the closing member is screwed into the connecting portion between the folded flow path and the lateral flow path. When the given condition is satisfied in which, for example, temperature of the lower part of the vehicle becomes high, the closing member allows the lateral flow path and the folded flow path to communicate with each other so that it is possible to discharge high pressure gas to the outside of the case from the exhaust gas flow path.

In the foregoing aspect, the communication flow path may be connected with the vertical flow path. The ventilation mechanism may include a throttle portion that is formed near a connecting portion between the vertical flow path and the communication flow path and made as a part of the vertical flow path is narrowed down. The ventilation mechanism may suck the air inside the case from the communication flow path and discharge the air to the outside of the case due to a Venturi effect when the given condition is satisfied.

In the foregoing aspect, the ventilation mechanism may include a first impeller provided in the folded flow path, a second impeller provided in the communication flow path, and a shaft that connects the first impeller and the second impeller with each other. The second impeller may be rotated as the first impeller is rotated.

In the foregoing aspect, the case may include an introduction portion that is configured to introduce air into the case from the outside of the case. With the above configuration, it is possible to introduce air of the outside of the case from the introduction portion as air inside the case is discharged.

In the foregoing aspect, the communication flow path may be provided in a first end side of the case in the vehicle front-rear direction. An introduction portion may be provided on a second end side of the case in the vehicle front-rear direction. The introduction portion is configured to introduce air from an outside of the case.

With the above configuration, it is possible to introduce air outside the case from the introduction portion as air is discharged from the communication flow path. Further, because the introduction portion is provided on the opposite side of the container body from the communication flow path in the axis direction, it is possible to restrain high-temperature air from staying inside the case.

In the above configuration, a plurality of the introduction portions may be provided in the case. With the foregoing configuration, it is possible to ventilate the inside of the case more efficiently compared to a structure in which only one introduction portion is provided.

In the above aspect, the case may include a bottom portion, a peripheral wall portion, and a ceiling portion. The container body is fixed to the bottom portion. The peripheral wall portion is erected on the bottom portion and configures a peripheral wall of the case. The ceiling portion has a shape corresponding to the peripheral wall portion and is joined to an upper surface of the peripheral wall portion. The introduction portion may be provided in the ceiling portion of the case. With the foregoing configuration, since the introduction portion is provided in the ceiling portion of the case, it is possible to discharge air in an upper part of the case.

In the foregoing aspect, an entrance of the introduction portion may be away from the case. With the foregoing configuration, it is possible to restrain introduction of high-temperature air around the case.

In the high pressure container unit according to the first aspect of the disclosure, the closing member may be a fusible plug. The fusible plug may be configured to allow high pressure gas stored in the container body to be discharged from the pipe as at least a part of the fusible plug melts at given temperature.

The high pressure container unit according to the first aspect of the disclosure may further include a communication flow path that allows internal space of the case and external space of the case to communicate with each other. The case may have a box shape, be mounted on a lower part of a vehicle, and include a ceiling portion, a bottom portion, and a peripheral wall portion. The container body may be provided inside the case. The pipe may include a common flow path and an exhaust gas flow path. The common flow path connects the container body and a valve with each other. The exhaust gas flow path is branched from the common flow path and extends to the outside of the case. The closing member may be a fusible plug. The ventilation mechanism may be configured to discharge air inside the case from the communication flow path as high pressure gas stored in the container body is discharged from the exhaust gas flow path when at least a part of the fusible plug melts.

As described above, according to each of the aspects of the disclosure, in a structure in which a high pressure container is mounted on a lower part of a vehicle, it is possible to effectively ventilate an area around the high pressure container such as a fuel tank when temperature of the lower part of the vehicle becomes high.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

A high pressure container unit 10 according to a first embodiment is described with reference to the drawings. An arrow FR, an arrow UP, and an arrow RH shown in each of the drawings indicate a front side, an upper side, and a right side of a vehicle 100 on which the high pressure container unit 10 is mounted, respectively. Hereinafter, when description is given simply with use of front-rear, upper-lower, and right-left directions, they mean a front-rear direction of the vehicle, an upper-lower direction of the vehicle, and a right-left direction of the vehicle in a vehicle width direction while the vehicle is directed to an advancing direction, unless otherwise specified.

Figure 1:
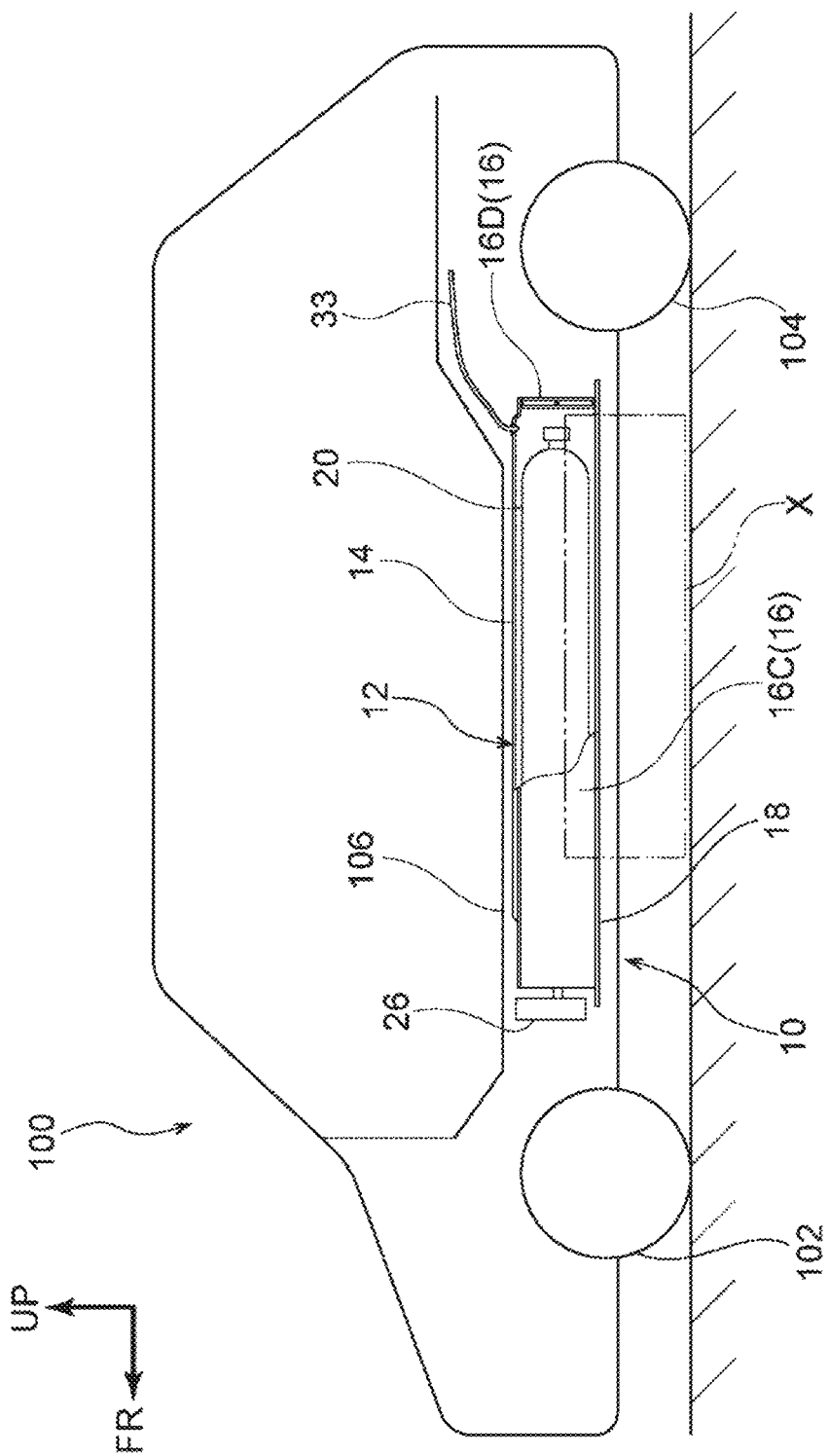
FIG. 1 is a schematic side view of a vehicle on which a high pressure container unit according to a first embodiment is mounted.

As shown in FIG. 1, the vehicle 100 on which the high pressure container unit 10 according to the embodiment is mounted includes a fuel cell stack (not shown). Also, the vehicle 100 is a so-called fuel cell vehicle in which power is generated as hydrogen and air is supplied to the fuel cell stack, and the power is supplied to a motor from the fuel cell stack so that the motor is driven.

The high pressure container unit 10 according to the embodiment is arranged between a front wheel 102 and a rear wheel 104, and mounted on a lower part of the vehicle. Specifically, the high pressure container unit 10 is arranged below a floor panel 106 that constructs a vehicle floor portion. In FIG. 1, a region X shown by a two-dot chain line indicates a range of flame during a flame exposure test that is a test to confirm safety of the high-pressure tank.

The high pressure container unit 10 includes a box-shaped case 12, and the case 12 includes a ceiling portion 14, a bottom portion 18, and a peripheral wall portion 16. Also, a plurality of container bodies 20 is provided inside the case 12.

Figure 2:
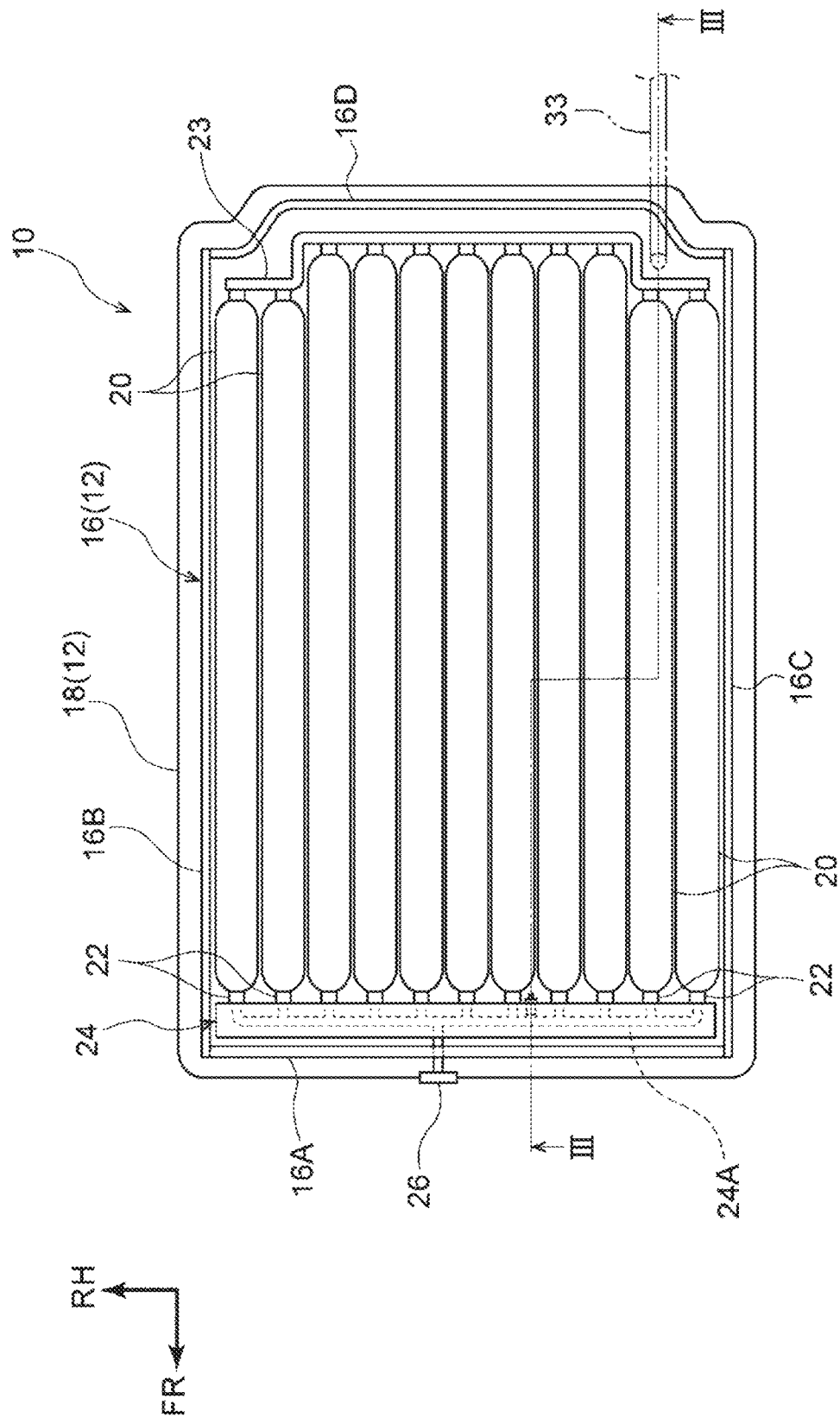
FIG. 2 is a plan view of an overall configuration of the high pressure container unit according to the first embodiment.

As shown in FIG. 2, the bottom portion 18 of the case 12 is a plate-shaped member that is formed into an almost rectangular shape in a plan view, and an external shape of the bottom portion 18 is larger than the peripheral wall portion 16. Then, both end portions of the bottom portion 18 in the vehicle width direction are joined to a vehicle skeleton member such as a rocker (not shown) so that the case 12 is fixed to the vehicle 100.

The peripheral wall portion 16 is erected on the bottom portion 18 and constructs a peripheral wall of the case 12. Further, the peripheral wall portion 16 includes a front wall 16A that extends in the vehicle width direction on the vehicle front side. Also, a right wall 16B extends from a right end portion of the front wall 16A to the vehicle rear side. Further, a left wall 16C extends from a left end portion of the front wall 16A to the vehicle rear side. A rear end of the right wall 16B and a rear end of the left wall 16C are connected with each other by a rear wall 16D that extends in the vehicle width direction.

In the embodiment, for example, each of the front wall 16A, the right wall 16B, the left wall 16C, and the rear wall 16D is formed by extrusion forming or the like into a closed sectional shape. Further, both end portions of the rear wall 16D in the vehicle width direction have a shape that is depressed to the inner side in order to prevent interference with peripheral members.

Figure 3:
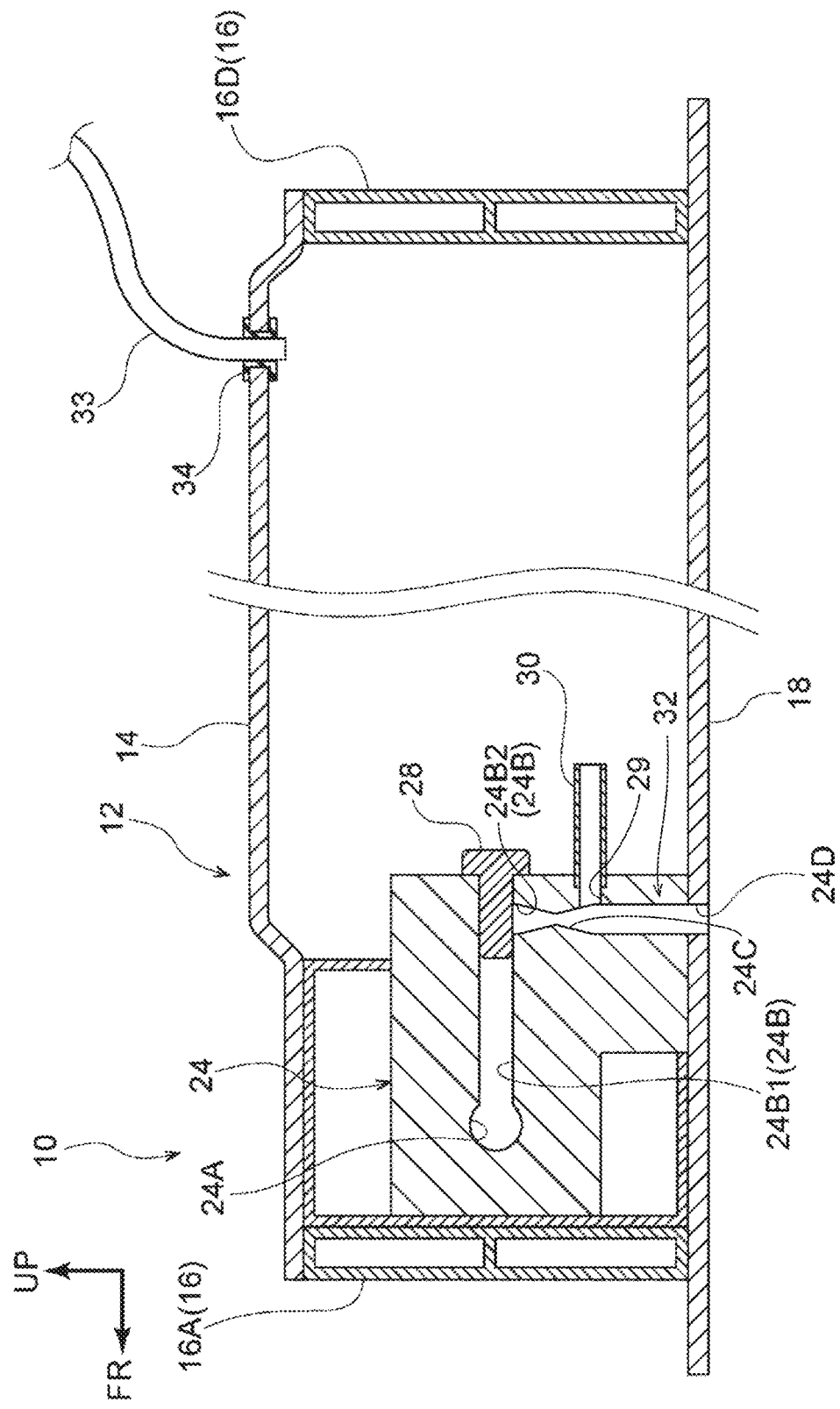
FIG. 3 is an enlarged sectional view taken along the line III-III in FIG. 2.

As shown in FIG. 3, the ceiling portion 14 of the case 12 is a plate-shaped member in which the vehicle upper-lower direction serves as its thickness direction, and the ceiling portion 14 has a shape corresponding to the peripheral wall portion 16. Further, a peripheral end portion of the ceiling portion 14 overlaps and is joined to an upper surface of the peripheral wall portion 16.

As shown in FIG. 2, the container bodies 20 are arranged inside the case 12, and, in the embodiment, for example, the eleven container bodies 20 are arranged in the vehicle width direction. Further, the two container bodies 20 arranged on a right end portion in the vehicle width direction, and the two container bodies 20 arranged on a left end portion of the vehicle width direction are formed so that their lengths in their axis directions are smaller than those of the remaining container bodies 20. In the embodiment, the container bodies 20 are formed with use of an aluminum alloy as a main component. However, the embodiment is not limited to this, and the container bodies 20 may be formed with use of resin as a main component.

Each of the container bodies 20 extends so that the vehicle front-rear direction serves as its axis direction, and is formed into an almost cylindrical shape. The container bodies 20 are formed so as to accommodate high pressure gas, and, in the embodiment, hydrogen gas serving as a fuel is stored in the container bodies 20.

Here, a cap 22 is attached to a first end side of each of the container bodies 20 in the axis direction (the vehicle front side), and a manifold 24 serving as pipe is connected with the cap 22. The manifold 24 extends along the front wall 16A of the peripheral wall portion 16 in which the vehicle width direction serves as a longitudinal direction of the manifold 24. The manifold 24 is provided with a common flow path 24A that is communicated with the container bodies 20, and allows internal spaces of the container bodies 20 to communicate with each other. Further, the common flow path 24A is connected with a valve 26 provided outside the case 12.

Meanwhile, an end portion of each of the container bodies 20 on a second end side in the axis direction (the vehicle rear side) is fixed to the bottom portion 18 of the case 12 through a bracket 23. Thus, the container bodies 20 do not move inside the case 12.

As shown in FIG. 3, the manifold 24 has an exhaust gas flow path 24B branched from the common flow path 24A. The exhaust gas flow path 24B includes a lateral flow path 24B1 and a vertical flow path 24B2. The lateral flow path 24B1 extends from the common flow path 24A to the vehicle rear side, and the vertical flow path 24B2 extends from the lateral flow path 24B1 to the vehicle lower side. Further, the vertical flow path 24B2 is open to the outside of the case 12 from an exhaust port 24D formed in the bottom portion 18.

A rear end portion of the lateral flow path 24B1 of the exhaust gas flow path 24B is open on a surface of the manifold 24 on the vehicle rear side, and this opening is closed by a fusible plug 28. The fusible plug 28 is screwed to a connecting portion between the lateral flow path 24B1 and the vertical flow path 24B2 and closes the exhaust gas flow path 24B so that high pressure gas does not flow into the vertical flow path 24B2. The fusible plug 28 is structured so as to melt at least partially at given temperature. As at least a part of the fusible plug 28 melts, the lateral flow path 24B1 and the vertical flow path 24B2 communicate with each other, and high pressure gas is discharged from the exhaust port 24D. The fusible plug 28 is an example of a closing member.

A communication flow path 29 is formed in a center portion of the vertical flow path 24B2 of the exhaust gas flow path 24B. The center portion is in the center of the vertical flow path 24B2 in the upper-lower direction. The communication flow path 29 communicates with space inside the case 12 through a discharge pipe 30 that projects into the inside of the case 12 from the manifold 24. Further, the communication flow path 29 allows the internal space of the case 12 and external space to communicate with each other through the vertical flow path 24B2. This means that a part of the communication flow path 29 is used together with the vertical flow path 24B2.

Here, the vertical flow path 24B2 of the exhaust gas flow path 24B according to the embodiment is provided with a ventilation mechanism 32. The ventilation mechanism 32 includes a throttle portion 24C formed in the vertical flow path 24B2.

The throttle portion 24C is formed in the vertical flow path 24B2 near a connecting portion between the vertical flow path 24B2 and the communication flow path 29, and a distance between the throttle portion 24C and the exhaust port 24D is longer than a distance between the connecting portion with the communication flow path 29 and the exhaust port 24D. In other words, compared with the connecting portion with the communication flow path 29, the throttle portion 24C is formed in the upstream side of the flow of the high pressure gas. The throttle portion 24C is formed so that the flow path is narrowed down gradually towards the vehicle lower side and gradually expands towards the vehicle lower side from the narrowest position of the flow path. This means that a part of the vertical flow path 24B2 configures a Venturi tube.

As shown in FIG. 1 and FIG. 2, an introduction pipe 33 serving as an introduction portion is provided in the second end side (the vehicle rear side) of the container body 20 in the case 12 in the axis direction. The introduction portion introduces air from the outside of the case 12. As shown in FIG. 3, the introduction pipe 33 is connected with the ceiling portion 14 of the case 12, extends from the ceiling portion 14 to the vehicle upper side and the vehicle rear side, and reaches above the rear wheel 104 (see FIG. 1). Further a seal member 34 is provided between the introduction pipe 33 and the ceiling portion 14.

Next, description is given regarding a case where temperature of the lower part of the vehicle 100 becomes high. The case where temperature of the lower part of the vehicle 100 becomes high is an example of a case where a given condition is satisfied. As shown in FIG. 1, in the flame exposure test, a range of 350 mm from an end portion that is away from the fusible plug 28 (the vehicle rear end portion) is exposed to fire for 10 minutes (localized fire). Thereafter, a range of 2000 mm from the vehicle rear end portion is exposed to fire for 10 minutes (engulfing fire).

Figure 4:
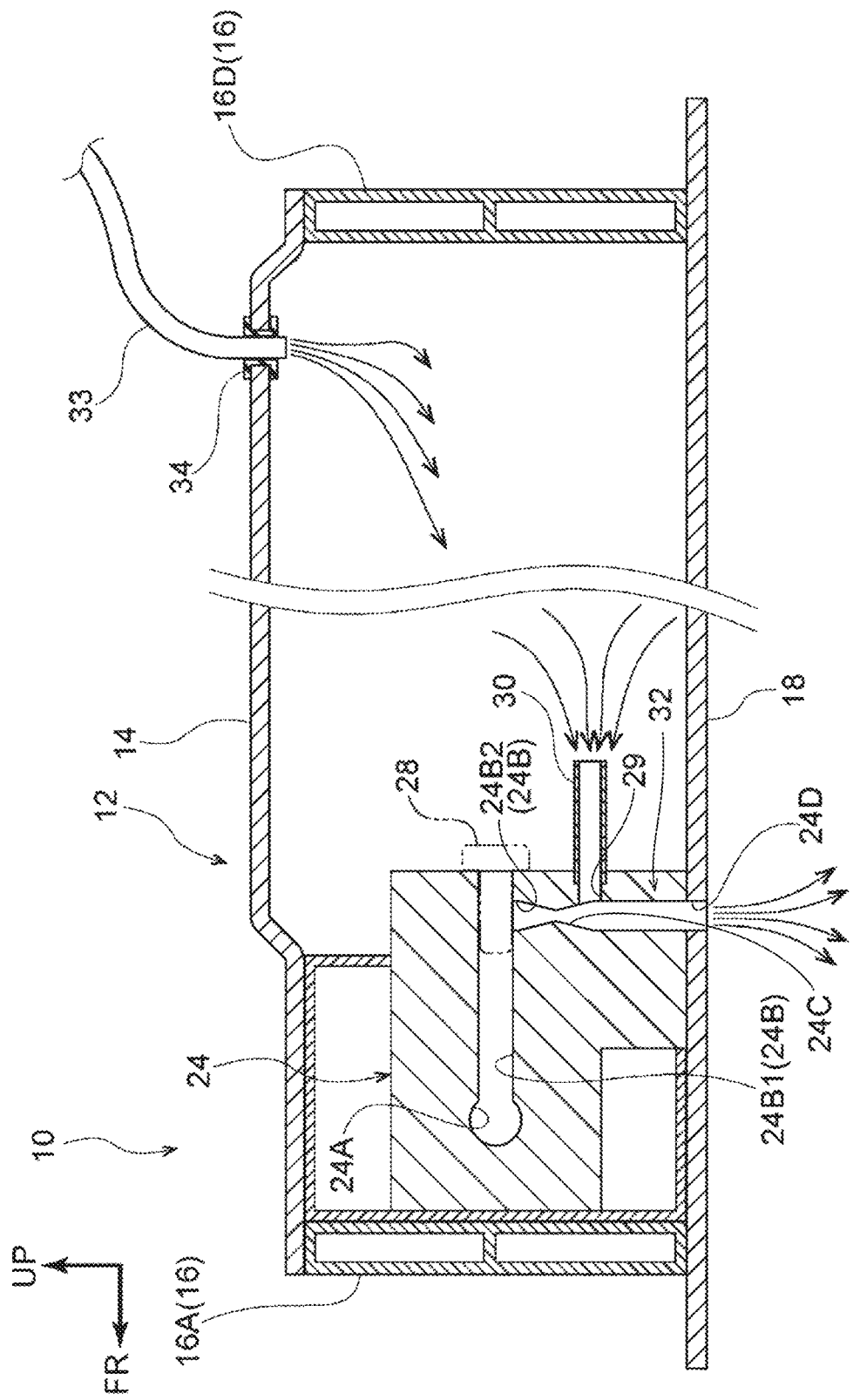
FIG. 4 is an enlarged sectional view corresponding to FIG. 3, showing a case where a fusible plug has melted from the state shown in FIG. 3.

At this time, because at least a part of the fusible plug 28 melts, high pressure gas stored in the container body 20 flows from the common flow path 24A to the exhaust gas flow path 24B of the manifold 24 and is discharged from the exhaust port 24D as shown in FIG. 4.

Here, since the throttle portion 24C is formed in the vertical flow path 24B2 of the exhaust gas flow path 24B, flow speed of the high pressure gas increases at the throttle portion 24C, and negative pressure is generated near the throttle portion 24C (the Venturi effect). Because of this, as the high pressure gas is discharged, air inside the case 12 is sucked into the vertical flow path 24B2 from the discharge pipe 30 and discharged together with the high pressure gas from the exhaust port 24D to the outside of the case 12 like a jet pump. Further, as air inside the case 12 is discharged, air is introduced from the outside to the inside of the case 12 through the introduction pipe 33.

Effects

Next, effects of the embodiment are described.

In the high pressure container unit 10 according to the embodiment, the box-shaped case 12 is mounted on the lower part of the vehicle 100, and the case 12 includes the ceiling portion 14, the bottom portion 18, and the peripheral wall portion 16. The container bodies 20 that store high pressure gas are provided inside the case 12. As described above, because the container bodies 20 are provided inside the case 12, it is possible to protect the container bodies 20.

Further, when temperature of the lower part of the vehicle 100 becomes high, at least a part of the fusible plug 28 melts, allowing the lateral flow path 24B1 and the vertical flow path 24B2 of the exhaust gas flow path 24B to communicate with each other. Thus, high pressure gas stored in the container bodies 20 can be discharged from the exhaust gas flow path 24B to the outside of the case 12.

Further, the throttle portion 24C that configures the ventilation mechanism 32 is formed in the vertical flow path 24B2 of the exhaust gas flow path 24B, and configured so as to allow air inside the case 12 to be discharged from the communication flow path 29 as exhaust gas is discharged. Thus, it is possible to restrain temperature inside the case 12 from becoming high until the high pressure gas stored in the container bodies 20 is discharged. This means that, in the structure in which the high pressure container is mounted on the lower part of the vehicle 100, when temperature of the lower part of the vehicle 100 becomes high, it is possible to effectively ventilate an area around the high pressure container such as a fuel tank.

In particular, in the embodiment, because the throttle portion 24C is formed, air inside the case 12 is discharged due to the Venturi effect. Therefore, it is possible to ventilate the inside of the case with a simple structure.

Furthermore, in the embodiment, it is possible to introduce air from the outside of the case 12 from the introduction pipe 33 as air is discharged from the communication flow path 29. Furthermore, the introduction pipe 33 is provided on the opposite side of the container body 20 from the communication flow path 29 in the axis direction. Therefore, it is possible to restrain high-temperature air from staying inside the case 12. This means that, in FIG. 2, when an introduction pipe is provided in a center portion of the case 12 in a plan view, since air introduced into the case 12 from the introduction pipe flows to the vehicle front side, ventilation becomes difficult on the vehicle rear side of the introduction pipe. On the contrary, as described in the embodiment, since the introduction pipe 33 is provided in the vehicle rear end portion of the case 12, it is possible to effectively ventilate the inside of the case 12.

Moreover, in the embodiment, as shown in FIG. 1, the introduction pipe 33 is extended to above the rear wheel 104 and an entrance of the introduction pipe 33 is distanced from the case 12. Thus, it is possible to restrain introduction of high-temperature air around the case 12. This means that it is possible to introduce air at nearly normal temperature into the case 12 from the introduction pipe 33.

In the embodiment, the introduction pipe 33 is provided in the vehicle rear end portion and a left edge of the ceiling portion 14 of the case 12 in the vehicle width direction. However, the embodiment is not limited to this. For example, like a modification shown in FIG. 5, a plurality of introduction pipes may be provided.

Modification

Figure 5:
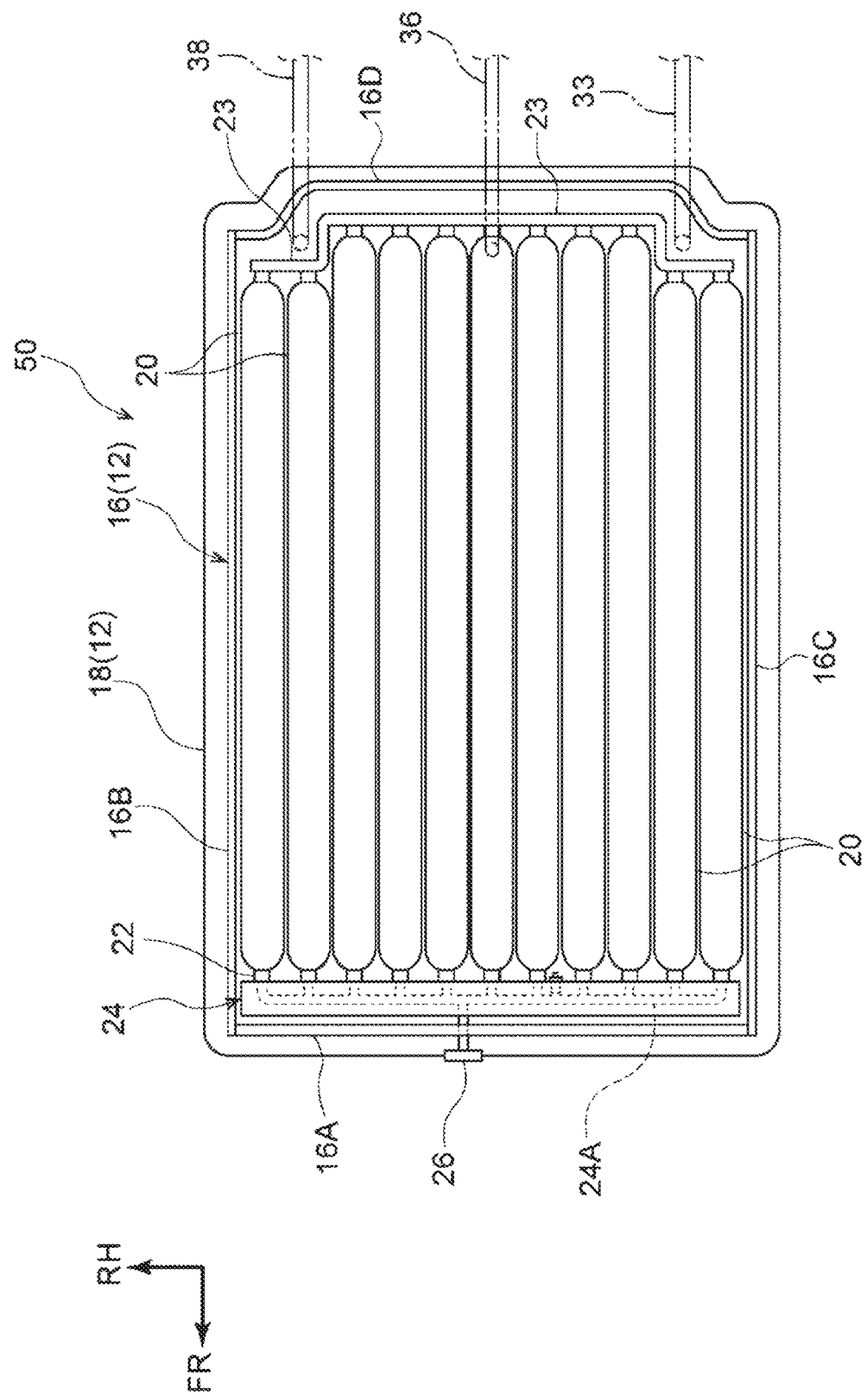
FIG. 5 is a plan view corresponding to FIG. 2, showing a modification of the high pressure container unit according to the first embodiment.

As shown in FIG. 5, in a high pressure container unit 50 according to the modification, introduction pipes 33, 36, 38 serving as three introduction portions are provided in an end portion of the case 12 on the vehicle rear side. The introduction pipe 33 is provided in a vehicle rear end portion and a left end portion of the ceiling portion 14 in the vehicle width direction, and the introduction pipe 38 is provided in the vehicle rear end portion and a right end portion of the ceiling portion 14 in the vehicle width direction. Further, the introduction pipe 36 is provided in a center portion of the ceiling portion 14 in the vehicle width direction between the introduction pipe 33 and the introduction pipe 38.

As described above, as the introduction pipes 33, 36, 38 are provided in the high pressure container unit 50 according to the modification, it is possible to ventilate an inside of the case 12 more efficiently compared to a structure in which only one introduction pipe is provided. As the introduction pipes 33, 36, 38 are provided in the ceiling portion 14 of the case 12, air in an upper part of the case 12 can be discharged.

Second Embodiment

Next, a high pressure container unit 60 according to a second embodiment is described. The same reference numerals are given to constituents similar to those of the first embodiment, and description is omitted as appropriate.

Figure 6:
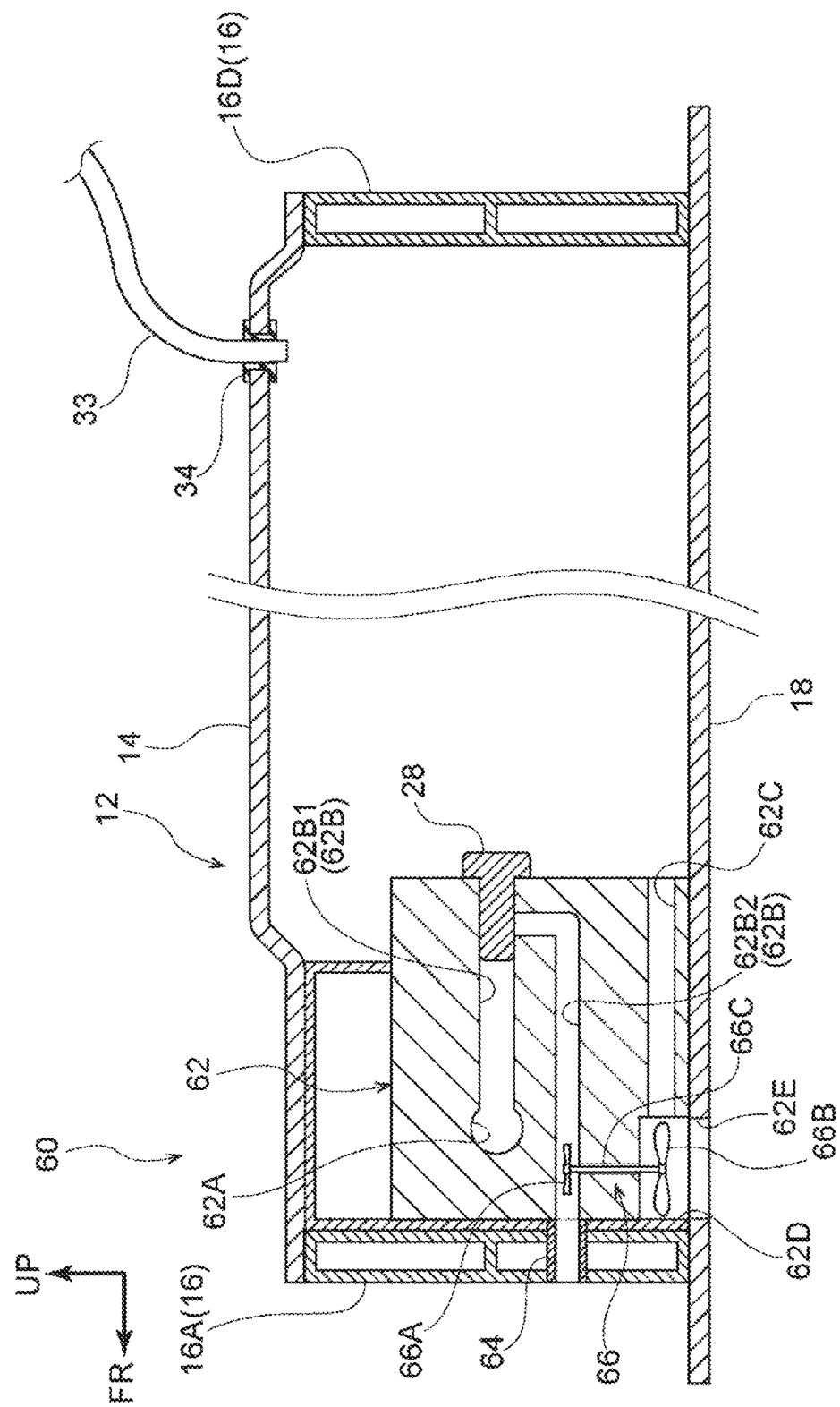
FIG. 6 is an enlarged sectional view of a main part of a high pressure container unit according to a second embodiment.

As shown in FIG. 6, a manifold 62 is provided in an end portion of the high pressure container unit 60 according to this embodiment on the vehicle front side, and the manifold 62 is connected with each container body 20 through a cap 22 similarly to the first embodiment (see FIG. 2). Further, the manifold 62 extends along a front wall 16A of a peripheral wall portion 16 such that the vehicle width direction is a longitudinal direction of the manifold 62. The manifold 62 is provided with a common flow path 62A that is communicated with the container bodies 20, and allows internal spaces of the container bodies 20 to communicate with each other. Further, the common flow path 62A is connected with a valve 26 provided outside a case 12 (see FIG. 2).

Here, the manifold 62 is provided with an exhaust gas flow path 62B branched from the common flow path 62A. The exhaust gas flow path 62B includes a lateral flow path 62B1 and a folded flow path 62B2. The lateral flow path 62B1 extends from the common flow path 62A to the vehicle rear side, and the folded flow path 62B2 is folded from a rear portion of the lateral flow path 62B1 to the vehicle front side. The folded flow path 62B2 is open to an outside of the case 12 through an exhaust pipe 64 that passes through the front wall 16A.

The rear end portion of the lateral flow path 62B1 of the exhaust gas flow path 62B is open on a surface of the manifold 62 on the vehicle rear side, and this opening is closed by a fusible plug 28. The fusible plug 28 is screwed into a connecting portion between the lateral flow path 62B1 and the folded flow path 62B2 and closes the exhaust gas flow path 62B so that the high pressure gas does not flow to the folded flow path 62B2. Further, the fusible plug 28 is structured so as to at least partially melt at given temperature. Because at least a part of the fusible plug 28 melts, the lateral flow path 62B1 and the folded flow path 62B2 are allowed to communicate with each other, and the high pressure gas is thus discharged to the outside of the case 12 from the exhaust pipe 64.

Meanwhile, a communication flow path 62C is formed in a lower end portion of the manifold 62. The communication flow path 62C extends in the vehicle front-rear direction, and a rear end portion of the communication flow path 62C communicates with internal space of the case 12. A front end portion of the communication flow path 62C serves as an exhaust portion 62D having a larger diameter than a general portion, and an exhaust port 62E that is open on a lower side is formed in the exhaust portion 62D. As described above, the communication flow path 62C allows the internal space of the case 12 and the external space to communicate with each other.

Here, in the embodiment, a ventilation mechanism 66 is configured that it includes a first impeller 66A, a second impeller 66B, and a shaft 66C. The first impeller 66A is provided in the folded flow path 62B2 of the exhaust gas flow path 62B, and is configured so as to be able to rotate about a rotational axis in which the vehicle upper-lower direction serves as the axis direction. Therefore, the first impeller 66A is rotated by energy of a fluid (high pressure gas) flowing in the folded flow path 62B2.

The second impeller 66B is provided in the exhaust portion 62D of the communication flow path 62C and is configured so as to be able to rotate about a rotation axis in which the vehicle upper-lower direction serves as the axis direction. Further, the first impeller 66A and the second impeller 66B are connected with each other in the vehicle upper-lower direction by a shaft 66C.

Figure 7:
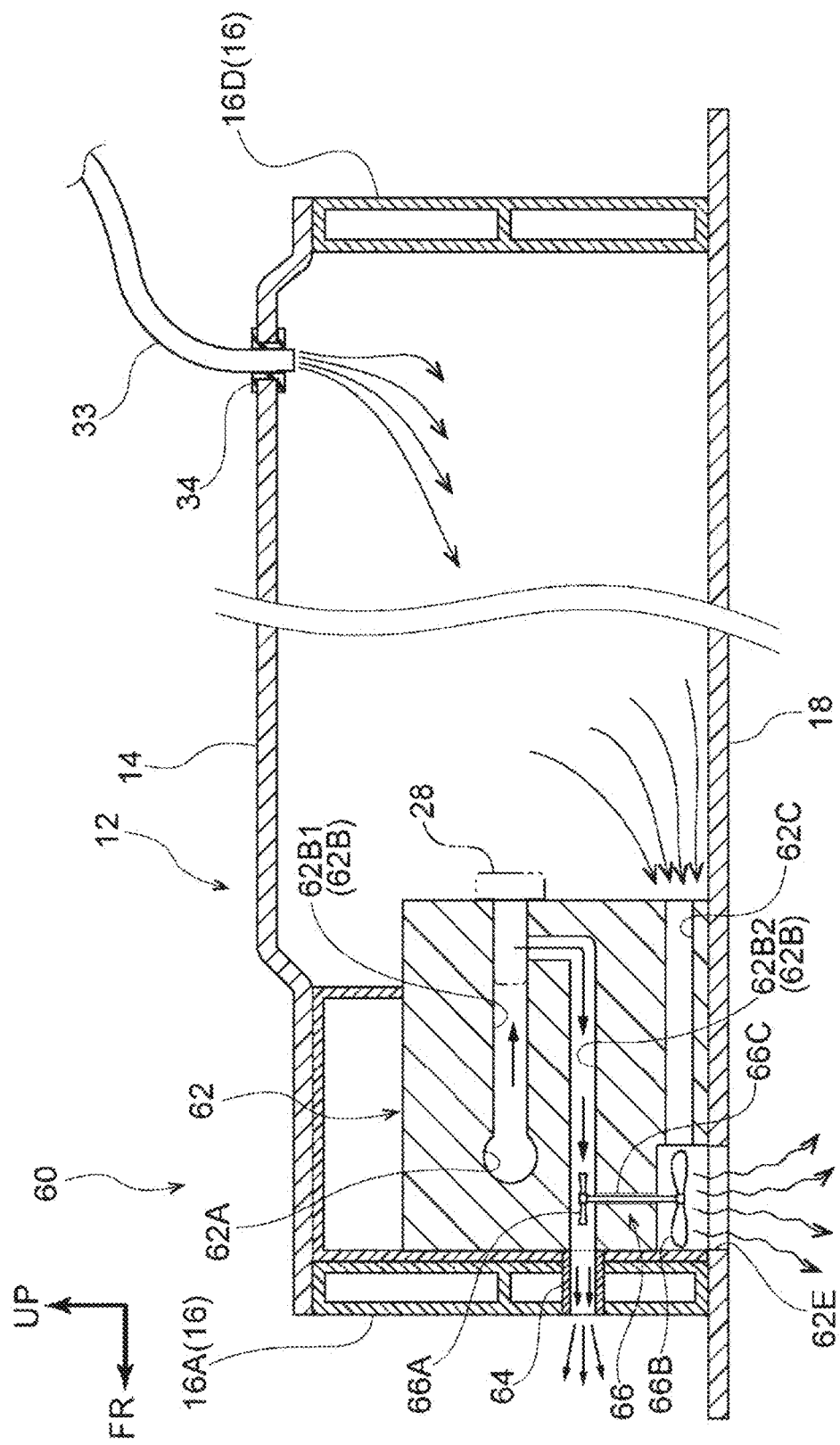
FIG. 7 is an enlarged sectional view corresponding to FIG. 6, showing a case where a fusible plug has melted from the state shown in FIG. 6.

The high pressure container unit 60 according to the embodiment is configured as described above, and, as shown in FIG. 7, as at least a part of the fusible plug 28 is melted, the high pressure gas flows to the exhaust gas flow path 62B from the common flow path 62A of the manifold 62 and is discharged to the outside of the case 12 from the exhaust pipe 64.

As the high pressure gas flows in the folded flow path 62B2 of the exhaust gas flow path 62B, the first impeller 66A is rotated, and rotation energy is transmitted to the second impeller 66B through the shaft 66C. Then, as the second impeller 66B is rotated, air inside the case 12 is sucked into the communication flow path 62C and discharged from the exhaust port 62E. As air inside the case 12 is discharged, air is introduced from the outside to the inside of the case 12 through the introduction pipe 33. As described above, when at least a part of the fusible plug 28 is melted, air inside the case 12 is discharged from the communication flow path 62C as the high pressure gas stored in the container body 20 is discharged from the exhaust gas flow path 62B.

Effects

Next, effects of the embodiment are described.

In the high pressure container unit 60 according to this embodiment, the exhaust gas flow path 62B and the communication flow path 62C are formed as separate flow paths. Therefore, it is possible to discharge air inside the case 12 more efficiently than a structure in which the communication flow path 62C is connected with the exhaust gas flow path 62B and the high pressure gas and air are discharged together. The rest of the effects are the same as those of the first embodiment.

The embodiments have been described so far. However, of course, the embodiments can be carried out in various forms without departing from the gist of the embodiments. For example, as shown in FIG. 2, in the embodiments, the number of the fusible plug 28 provided is only one. However, the embodiments are not limited to this, and a plurality of fusible plugs may be provided.

Further, in the foregoing embodiments, the container bodies 20 are arrayed in the vehicle width direction. However, the embodiments are not limited to this. For example, the container bodies 20 may be arrayed in the vehicle front-rear direction. In this case, an axis direction of each of the container bodies 20 is the vehicle width direction.

Also, the fusible plug 28 according to the embodiments is an example of a closing member. The shape and structure of the closing member are not particularly limited, and the closing member may be a member other than the fusible plug or may have a different shape as long as the closing member has a structure to close the exhaust gas flow path and allow high pressure gas to be discharged from the exhaust gas flow path when the given condition is satisfied.

Furthermore, the case where the given condition is satisfied is not limited to the case where temperature becomes given temperature, and may be a case where a different condition is satisfied. The given temperature in the embodiments may be the same or different.

Moreover, in the embodiments, the introduction pipe 33 is provided as the introduction portion. However, the embodiments are not limited to this, and the introduction portion may be omitted. Even in this case, for example, as shown in FIG. 4, air flows into the case 12 from a gap of the case 12 as air inside the case 12 is discharged from the exhaust port 24D.

What is claimed is:

1. A high pressure container unit comprising:
a container body configured to store high pressure gas;
a case that stores the container body inside the case;
a pipe that is connected with the container body and extends to an outside of the case;
a closing member that is configured to close the pipe and allow the high pressure gas stored in the container body to be discharged from the pipe when a given condition is satisfied; and
a ventilation mechanism that discharges air inside the case to the outside of the case by way of pressure exerted during discharge of high pressure gas from the container body when the given condition is satisfied.

2. The high pressure container unit according to claim 1, wherein:
the pipe includes:
a common flow path that is communicated with internal space of the container body; and
an exhaust gas flow path that is branched from the common flow path and extends to the outside of the case;
the closing member is configured to close the exhaust gas flow path; and
the closing member is configured to allow the high pressure gas stored in the container body to be discharged from the exhaust gas flow path when the given condition is satisfied.

3. The high pressure container unit according to claim 2, further comprising a communication flow path that allows internal space of the case and external space of the case to communicate with each other, wherein the ventilation mechanism discharges the air inside the case to the outside of the case from the communication flow path when the given condition is satisfied.

4. The high pressure container unit according to claim 3, wherein:
the ventilation mechanism includes:
a first impeller provided in the exhaust gas flow path;
a second impeller provided in the communication flow path; and
a shaft that connects the first impeller and the second impeller with each other; and
the second impeller is rotated as the first impeller is rotated.

5. The high pressure container unit according to claim 4, wherein:
the exhaust gas flow path includes:
a lateral flow path extending to a first side of a vehicle front-rear direction; and
a folded flow path that is folded from the lateral flow path to a second side of the vehicle front-rear direction and is open to the outside of the case;
the closing member is screwed to a connecting portion between the lateral flow path and the folded flow path; and
the closing member is configured to allow the lateral flow path and the folded flow path to communicate with each other when the given condition is satisfied.

6. The high pressure container unit according to claim 5, wherein:
the ventilation mechanism includes:
a first impeller provided in the folded flow path;
a second impeller provided in the communication flow path; and
a shaft that connects the first impeller and the second impeller with each other; and
the second impeller is rotated as the first impeller is rotated.

7. The high pressure container unit according to claim 3, wherein:
the communication flow path is provided in a first end side of the case in a vehicle front-rear direction; and
an introduction portion is provided on a second end side of the case in the vehicle front-rear direction, the introduction portion being configured to introduce air from the outside of the case.

8. The high pressure container unit according to claim 7, wherein a plurality of introduction portions is provided in the case.

9. The high pressure container unit according to claim 7, wherein:
the case includes:
a bottom portion to which the container body is fixed;

a peripheral wall portion that is erected on the bottom portion and configures a peripheral wall of the case; and a ceiling portion that has a shape corresponding to the peripheral wall portion and is joined to an upper surface of the peripheral wall portion; and the introduction portion is provided in the ceiling portion of the case.

10. The high pressure container unit according to claim 7, wherein an entrance of the introduction portion is away from the case.

11. The high pressure container unit according to claim 1, wherein the case is provided with an introduction portion that is configured to introduce air into the case from the outside of the case.

12. The high pressure container unit according to claim 11, wherein a plurality of introduction portions is provided in the case.

13. The high pressure container unit according to claim 11, wherein:

the case includes:
 a bottom portion to which the container body is fixed;
 a peripheral wall portion that is erected on the bottom portion and configures a peripheral wall of the case; and
 a ceiling portion that has a shape corresponding to the peripheral wall portion and is joined to an upper surface of the peripheral wall portion; and the introduction portion is provided in the ceiling portion of the case.

14. The high pressure container unit according to claim 11, wherein an entrance of the introduction portion is away from the case.

15. The high pressure container unit according to claim 1, wherein:

the closing member is a fusible plug; and the fusible plug is configured to allow the high pressure gas stored in the container body to be discharged from the pipe as at least a part of the fusible plug melts at given temperature.

16. The high pressure container unit according to claim 1, further comprising:

a communication flow path that allows internal space of the case and external space of the case to communicate with each other, wherein:

the case has a box shape, is mounted on a lower part of a vehicle, and includes a ceiling portion, a bottom portion, and a peripheral wall portion;

the container body is provided inside the case;

the pipe includes a common flow path and an exhaust gas flow path, the common flow path connecting the container body and a valve with each other, the exhaust gas flow path being branched from the common flow path and extending to the outside of the case;

the closing member is a fusible plug; and the ventilation mechanism is configured to discharge air inside the case from the communication flow path as the high pressure gas stored in the container body is discharged from the exhaust gas flow path when at least a part of the fusible plug melts.

* * * * *